United States Patent [19]

Ohsaki et al.

[11] Patent Number: 4,458,022

[45] Date of Patent: Jul. 3, 1984

[54] PROCESS FOR MANUFACTURING MOLECULAR SIEVING CARBON

[75] Inventors: Takushi Ohsaki; Susumu Abe, both of Bizen, Japan

[73] Assignee: Kuraray Chemical Co., Ltd., Bizen, Japan

[21] Appl. No.: 495,488

[22] Filed: May 17, 1983

[30] Foreign Application Priority Data

Jun. 7, 1982 [JP] Japan .................................. 57-97276

[51] Int. Cl.$^3$ ........................ B01J 21/20; B01J 21/18; C01B 31/08
[52] U.S. Cl. ..................................... 502/42; 264/29.1; 423/460; 502/418; 502/436; 502/437
[58] Field of Search ....................... 252/421, 444, 445; 264/29.1, 29.3; 423/460, 461, 445, 449; 502/418, 420, 428, 429, 436, 437

[56] References Cited

U.S. PATENT DOCUMENTS 2,761,822 9/1956 Addison .............................. 252/421
4,371,454 2/1983 Hisatsugu et al. ................. 264/29.1

FOREIGN PATENT DOCUMENTS 56-84309 7/1981 Japan .................................. 423/461

Primary Examiner—P. E. Konopka
Attorney, Agent, or Firm—Oblon, Fisher, Spivak, McClelland & Maier

[57] ABSTRACT

A process for manufacturing molecular sieving carbon is disclosed, wherein pelletized charcoal made of coconut shell charcoal powder and coal tar is washed with dilute mineral acid solution, then a specified amount of coal tar is added, penetrated therein, followed by heat treatment under a particular range of temperature, and cooling in inert gas.

8 Claims, No Drawings

PROCESS FOR MANUFACTURING MOLECULAR SIEVING CARBON

BACKGROUND OF THE INVENTION

The property of active carbon derived from its microporous structure, are well known, among them, character of molecular sieve is worth notice. However, the diameter of micropores on active carbon prepared by conventional processes is usually greater than 10–20 Å, so micropores of this size are too large to separate molecules of small size, for example separation of nitrogen and oxygen gas from air, namely character of molecular sieve is inadequate. Several processes of manufacturing active carbon which is applicable for separation of oxygen and nitrogen gas from air, have been disclosed, wherein micropores are partially packed with fine carbon particles and the size become narrow, thus molecular sieving property is increased. For example, such a process is disclosed in Japanese Patent Publication No. 49-37036, wherein small amounts of prepolymer of phenol resin or furan resin are added to active carbon, then polymerized, carbonized by heating at 400°–1,000° C., thus micropore on active carbon is partially packed with carbonious material and endowed with character of molecular sieving. In Japanese Patent Publication No. 52-18675, coke of which volatile material content is less than 5%, is heated to 600°–900° C. in a furnace, then hydrocarbon vapour, such as benzene, toluene and producer gas, is introduced therein, soot generated by decomposition of hydrocarbon partially packs the micropores of the coke, thus a molecular sieve made of coke is formed. In this process, decomposition of hydrocarbon vapour in the furnace is considered to be an indispensable requirement. In Japanese Patent Application Laid Open No. 49-106982, a method to narrow the size of the micropores of coke is described, wherein an organic compound in vapour or in solution is adsorbed onto the surface of coke, thus, the micropore is partially packed. In Japanese Patent Application Laid Open No. 56-130226, a method to narrow the size of the micropores of carbon of size of more than 0.5 mm, is described wherein a concentration of hydrocarbon in vapour of less than 2%, is adsorbed to the surface of carbon and heated, thus the soot generated by the decomposition of the hydrocarbon adhered to the surface of it and narrowed the micropores. In this treatment, hydrocarbon is necessary to have molecular size of more than 0.5 mm such as methane, ethane and styrene. This method comprises to decompose gaseous hydrocarbon and precipitate its soot in the micropores of active carbon or to adsorb gaseous hydrocarbon in these micropores then decompose in it, consequently narrows their size with soot, thus improves the carbons molecular sieving property. In this process, it is necessary to introduce the gaseous hydrocarbon into the furnace and decompose, precipitate soot on adsorbent, so with this process it is complicated and difficult to obtain high quality molecular sieving carbon stably. At the same time, cost of the product becomes expensive. In Nenryokyokaishi vol. 60, No. 654, page 859–864 (1982), a method to improve the molecular sieving property of Yallourn char is described, wherein, 4–5% of exhaust liquor of sulfite pulp and coal tar pitch are added to Yallourn char then pelletized, heated to 600°–700° C. at the speed of 10° C. min$^{-1}$ in nitrogen gas and maintained for 1 hour. In this process, the hardness of the pellet is inadequate because of the exhaust liquor of the sulfite pulp used as the binder, and it is difficult to maintain molecular sieving property of the product constantly.

BRIEF SUMMARY OF INVENTION

It is an object of this invention to provide a process for manufacturing molecular sieving carbon, which has improved selectivity especially applied in the separation of gases of small molecular size, for example, separation of nitrogen gas from air. This process comprises pelletizing powder of coconut shell charcoal containing small amounts of coal tar as binder, carbonizing, washing in mineral acid solution, then adding specified amounts of coal tar, heating at a specified temperature and time, after then, cooling in inert gas.

DETAILED DESCRIPTION OF THE INVENTION

Inventors have researched how to improve the molecular sieving character of active carbon for a long time. In this research, following information was found that an aggregation of fine carbon crystallite could be grown when an active carbon containing easily crystallizing carboneous substance, such as coal tar pitch, was heat treated under specified temperature and time, then these crystallites grown in the micropore diminished their size. According to these findings, we achieved present invention, that is, the process for manufacturing improved molecular sieving carbon, wherein, charcoal powder of coconut shell was specified as the raw material to which was added specified amounts of coal tar, then remove the salt of alkaline metal, heat treated under specified condition in high temperature, in order to endow high and stable molecular sieving property. In detail, the present invention is the process for manufacturing molecular sieving carbon which comprises, adding coal tar pitch and/or coal tar to the powder of coconut shell charcoal as a binder, pelletizing, carbonizing at 750°–900° C., washing in dilute mineral acid solution, drying then adding 1–3% coal tar pitch and/or coal tar, penetrating, therein at 200°–400° C., heating to 950°–1,000° C., then maintaining 10–60 minutes at that temperature, after that, cooling it in an inert gas. In the present invention, pelletized carbon made of coconut shell charcoal is specified as raw material, wherein, coal tar pitch and/or coal tar is added to the powder of coconut shell charcoal as a binder, then pelletized and carbonized. Pellets of molecular sieving carbon for separation of gases are preferred to have the uniform shape necessary to have the required hardness. Various kinds of wooden char can be used as raw material of active carbon, such as lignite, smokeless coal, wood, coke other than coconut shell charcoal, however, it is difficult to give hardness to active carbon which is made of wooden raw material more than certain extent except coconut shell charcoal. On the other hand, pelletized active carbon made of coal has adequate hardness, but lesser adsorption capacity and selectivity in comparison with one made of coconut shell charcoal, when it is used as adsorbent for separation of small size gases. When active carbon is made of wooden raw material, the mean diameter of micropore formed on the surface, is depend on activating condition and it is possible that their diameter diminishes to 12–15 Å under appropriate conditions.

When the active carbon is made of coal, it is too difficult to make the mean diameter of micropore smaller than 20 Å under any activating condition. However, the diameter of small molecular weight gas is usually less than 5 Å, so it is necessary to make the size of micropore smaller in order to increase molecular sieving property for these gaseous molecules. Comparison of the property of molecular sieving carbon is shown in Example 1 and Comparative Example 1, wherein the molecular sieving carbon produced by the same process, beside coconut shell char coal and coal are used as raw material respectively and the latter is inferior remarkably to the former in capacity of oxygen adsorption and selectivity. In the pelletizing process, 20–30% of coal tar pitch and/or coal tar is added to the coconut shell char coal as binder then mixing and pelletizing by conventional method. Coconut shell charcoal used as raw material is preferred to be crushed more than ones for other uses.

Then, it is necessary to dry well at 750°–900° C. and immersed in dilute mineral acid solution to remove soluble ingredient. In this step, drying becomes inadequate under 750° C. and capacity of oxygen and nitrogen gas adsorption decreases when dried at less than 900° C. Comparative Example 2 is the same process as Example 1 except dipping and washing in 0.6N HCl, then the capacity of oxygen adsorption and the selectivity are decreased either in comparison with Example 1, especially the selectivity decreases remarkably. Most of the ingredients removed by washing with acid solution are alkaline metal compounds contained in charcoal made of coconut shell and these same compounds prevents grow aggregation of fine carbon crystallite which partially packs the micropore in heat treatment, so this said step is one of the most important one in the present invention. The kind and concentration of acid is not specified, however, 0.4–0.6N HCl is preferable based on experience. The difference of adsorption speed between oxygen and nitrogen is hardly recognized immediately after washing with acid and drying of the pelletized charcoal.

Then 1–3% coal tar pitch and/or coal tar is mixed well with the above-mentioned charcoal at 200°–400° C. to permit adequate penetration therein heated to 950°–1,000° C. in inert gas, maintained for 10–60 minutes at that temperature. In this process, it is difficult to give adequate molecular sieving property when the coal tar content is less than 1%, on the other hand, gas adsorption capacity and selectivity decreases remarkably when coal tar content increases more than 3%. In the said process, the speed of temperature rising is not specified, but it is preferable to rise at a constant rate to make the product having uniform quality. Furthermore when the temperature is lower than 950° C., the adsorption capacity of gas is high but the selectivity (oxygen gas adsorption versus nitrogen) is low, on the other hand, when the temperature is higher than 1,000° C., the selectivity is high but adsorption capacity is low. The necessary time of heat treatment is affected by the temperature to some extent and the effect of the heat treatment becomes inadequate when said time is less than 10 minutes, while the adsorption capacity of gas remarkably decreases when said time is longer than 60 minutes.

The relationship between coal tar content and the selectivity is shown in Example 1 and Comparative example 3, and the relationship between the temperature of heat treatment and molecular sieving property is shown in Example 1, 3 and Comparative example 4. Considering either the oxygen adsorption capacity or the selectivity, it is especially preferable that the temperature of heat treatment be 950°–970° C. and the treatment time 20–30 minutes. The active carbon shows very low selectivity before heat treatment, however, high selectivity is endowed by said heat treatment for the first time, namely, high molecular sieving property. Furthermore, the relationship between these composing elements and their molecular sieving property is not elucidated adequately, however, it is recognized obiously that degree of crystallization is depend on these components when the above-mentioned active carbon is heat treated, namely, carbon made from coal tar pitch or coal tar has the property of easily graphitized and character of aggregation of fine carbon crystallite, the speed of graphitization is depend on temperature, time of heat treatment, and content of alkaline metal compound. On the other hand, charcoal made from coconut shell has the property of difficultly graphitized, and alkaline metal compounds such as sodium and potassium contained in it, penetrate into the carbon phase made from coal tar pitch and coal tar at high temperature of heat treatment and disturbs graphitization. So, alkali metal compounds are removed from charcoal by washing with mineral acid then easily graphitizing material such as coal tar is penetrated therein, and aggregation of fine graphite crystallite made from coal tar by decomposition in heat treatment, is grown up and partially packs the micropores of active carbon, consequently, molecular sieving property is endowed on it. Another process of endowing molecular sieving character on charcoal has been known as described in back ground of this invention, wherein, vapor of hydrocarbon is blown into the furnace at high temperature and fine carbon particle formed by decomposition is precipitated on inner surface of active carbon and makes the size of micropore narrow.

On the other hand, in this invention coal tar penetrated into the surface of active carbon, is decomposed to carbon by heat treatment then aggregation of fine carbon crystallite is grown through mesophase on inner surface of micropore, so the property and character of the surface in micropore is considered to be quite different from the above-mentioned reference. There is a close relationship between gas adsorption capacity, the selectivity (nitrogen vers oxygen), and temperature of heat treatment, wherein, the higher the treatment temperature is, the lower the adsorption capacity of nitrogen/oxygen gas is, while the higher remarkably the selectivity is, namely the adsorption capacity of gas and the selectivity are inversely effected by temperature, for example, in Comparative example 4, treatment temperature (T); 900° C., adsorption capacity of oxygen ($O_2$); 7.5 ml/g the selectivity (S); 21, in Experiment 1, T; 950° C., $O_2$; 6.0 ml/g, S; 26 and in Experiment 3, T; 1,000° C., $O_2$; 5.2 ml/g, S; 27.

This relationship shows that growth rate of aggregation of fine carbon crystallite in micropore much depend on treatment temperature. It is preferable that adsorption capacity of oxygen is more than 5 ml/g and the selectivity is more than 22–23, for separation of nitrogen and oxygen by pressure swing adsorption process.

It is necessary to cool the adsorbent in inert gas after heat treatment. In this process, cooling temperature is preferred to be less than 300° C., when adsorbent is takened out from the furnace and contacted with air at a temperature higher than 300° C., adsorption capacity of oxygen remarkably decreases.

The adsorbent prepared by the present invention, is preferable for the separation of nitrogen and oxygen gas by pressure swing adsorption process, at the same time, it is available for separation of gases of which size of molecule is less than 5 Å by the same process, based on difference of the size.

In the present specification, the method of measurement of adsorption capacity and the selectivity which is introduced for evaluation of the adsorbent, are as follows.

Sample of the adsorbent (about 10 g) is left in reduced pressure for desorption of previously adsorbed material, then introduces oxygen or nitrogen gas of 1 atmosphere at 25° C. and the adsorption capacity is showed as volume of gas (ml/g) adsorbed in 60 seconds.

The selectivity is measured by the following procedure, at first, volume of adsorbed oxygen gas in 5 seconds, at 25° C., 1 atmosphere, is measured, then necessary time of adsorption of same volume of nitrogen gas (expressed as $TN_2$), the value $(S=TN_2/5)$ is defined as the selectivity. This value has close relationship with capacity of adsorbent when it is used for pressure swing adsorption process, among various value are considered for this purpose.

To further illustrate present invention, and not by way of limitation, the following examples are given.

EXAMPLE 1

8 parts of coal tar and 3 parts of water are added to 30 parts of well crushed coconut shell charcoal, mixed well in a Knieder, then molded into pellets having a diameter of 2 mm.

Then the pellets are carbonized by heating up to 700° C. for 30 minutes in a 4 stage fludized bed furnace, further in an electric furnace at 850° C. The carbonized pellets are dipped in 0.6N HCl for 2 hours, washed adequately with water and dryed, then 2% of coal tar is added and penetrated into the dryed pellets by heating and mixing in rotary kiln at 350° C., it takes about 10 minutes for penetrating into the pellets adequately at that temperature and then heated up to 950° C., for 20 minutes in an electric furnace, introducing nitrogen gas into it during the heat treatment, cooled in nitrogen gas, thus is abtained molecular sieving carbon. Porperty of it as follows; adsorption capacity of oxygen gas is 6 ml/g, the selectivity is 26.

Result of evaluation for practical use with small size pressure swing adsorption testing apparatus are as follows.

volume of molecular sieving carbon packed in adsorber; 1.08 L
number of adsorber; 2
adsorption pressure; 3.5 kg/cm² (Gauge)
desorption pressure; 100 mm Hg
adsorption time, desorption time; 60 seconds, either
Purity of obtained nitrogen gas is 99.9% stable for long time at $SV^{-1}=0.6$, and 99.2% at $SV^{-1}=2.0$ wherein concentration of nitrogen is calculated from the value of oxygen concentration meter.

Results of small size testing apparatus are considered to be a little scattered so inventors adopted oxygen adsorption capacity and the selectivity for evaluation of product and refering results of testing apparatus.

EXAMPLE 2

2 mm pelletized charcoal obtained in Example 1, wherein carbonized at 850° C., extructed with HCl, washed and dryed, is used as raw material. 1.5% of coal tar pitch is added to above-mentioned pellet and penetrated therein adequately by heating and mixing in rotary kiln at 400° C., maintained for 20 minutes at that temperature.

After cooling, it is charged into an electric furnace and heated up to 950° C., maintained for 20 minutes, introducing nitrogen gas into it during the heat treatment, cooled in nitrogen gas, thus is obtained molecular sieving carbon. Property of it as follows; adsorption capacity of oxygen gas is 5.6 ml/g and the selectivity is 24.

Results of evaluation for practical use with small size pressure swing adsorption testing apparatus same as used in Example 1 are as follows; purity of obtained nitrogen gas is 99.9% stable for long time at $SV^{-1}=0.6$ and 99.0% at $SV^{-1}=2.0$.

EXAMPLE 3

Molecular sieving carbon is prepared as same as Example 1, except heat treated at 1,000° C., for 15 minutes. Property of the product is as follows; adsorption capacity of oxygen gas is 5.6 ml/g, and the selectivity is 27.

Results evaluation for practical use with small size pressure swing adsorption testing apparatus same as used in Example 1, are as follows; purity of obtained nitrogen gas in 99.9% stable for long time at $SV^{-1}=0.6$ and 99.1% at $SV^{-1}=2.0$.

COMPARATIVE EXAMPLE 1

Molecular sieving carbon is prepared as same as Example 2, except brown coal produced in Australia is used as raw material instead of coconut shell charcoal, carbonized at 700° C. and crushed then 30 parts of coal tar pitch is added to 100 parts of crushed coal for pelletizing.

Property of the product is as follows; adsorption capacity of oxygen gas is 5.0 ml/g and the selectivity is 20.

Results of evaluation for practical use with small size pressure swing adsorption testing apparatus same as used in Example 1 are as follows; purity of obtained nitrogen gas is 98.6% at $SV^{-1}=0.6$, but, it decreases to 95.0% at $SV^{-1}=2.0$.

COMPARATIVE EXAMPLE 2

2 mm pelletized charcoal obtained in Example 1, wherein carbonized at 850° C. without HCl extraction, is used as raw material. 2% of coal tar is added to above mentioned pellets and penetrated therein adequately by heating and mixing in rotary kiln at 350° C., maintained for 20 minutes at that temperature then it is charged into an electric furnace heated up to 950° C., maintained for 20 minutes, introducing nitrogen gas into it during heat treatment, cooled in nitrogen gas, thus obtained molecular sieving carbon. Property of it as follows; adsorption capacity of oxygen gas is 5.1 ml/g and the selectivity is 18.

Results of evaluation for practical use with small size pressure swing adsorption testing apparatus same as used in Example 1, are as follows; purity of obtained nitrogen gas is at first 99.2% at $SV^{-1}=0.6$ and 97.6% at $SV^{-1}=2.0$, but it decreases to 98.5% at $SV^{-1}=0.6$ in 20 days.

COMPARATIVE EXAMPLE 3

Molecular sieving carbon is prepared as same as Example 1 except amount of coal tar are 4% and 6% adding to pellet after acid extraction respectivety.

Property of product and result of evaluation for practical use with small size pressure swing adsorption testing apparatus are as follows;

(1)

Amounts of coal tar; 4%
adsorption capacity of oxygen; 4.3 ml/g
the selectivity; 27
purity of nitrogen ($SV^{-1}=0.6$); 98.3%
purity of nitrogen ($SV^{-1}=2.0$); 93.7%

(2)

Amounts of coal tar; 6%
adsorption capacity of oxygen; 3.2 ml/g
the selectivity; 28
purity of nitrogen ($SV^{-1}=0.6$); 96.3%
purity of nitrogen ($SV^{-1}=2.0$); 90.0%

COMPARATIVE EXAMPLE 4

9 parts of coal tar and 4 parts of water are added to 30 parts of well crushed coconut shell charcoal, mixed well and molded into pellets having a diameter of 2 mm. The pellet is carbonized by heating up to 600° C. for 3 hours in batchwise rotary kiln and then activated up to yield of 93% (on dry basis) at 850° C., introducing $CO_2$ gas (atmosphere in furnace; $CO_2$, 15-20%, the rest; $N_2$), in batchwise fluidized furnace, and adsorption capacity of thus obtained active carbon is 8 ml/g.

Said active carbon is extructed with 0.6N HCl solution for 2 hours and washed adequately, dryed. Then 3% of coal tar is added and penetrated into said active carbon by heating and mixing in rotary kiln at 350° C. for 15 minutes, further heated up to 900° C. for 15 minutes, introducing small amounts of nitrogen gas into it during heat treatment, in electric furnace, cooled in nitrogen gas, thus obtained molecular sieving carbon.

Property of it as follows; adsorption capacity of oxygen gas is 7.5 ml/g, the selectivity is 21, namely, the former value is adequately high, but the latter value is a little low for practical use.

Result of evaluation for practical use with small size pressure swing adsorption testing apparatus as same as used in Example 1, are as follows;
purity of nitrogen ($SV^{-1}=0.6$); 99.8% stable for long time
purity of nitrogen ($SV^{-1}=2.0$); 99.3%.

What is claimed as new and is intended to be secured by Letters Patent is:

1. A process for manufacturing molecular sieving carbon comprising the steps of:
   (a) adding coal tar pitch, coal tar, or a combination thereof to powdered coconut shell charcoal as a binder,
   (b) pelletizing said mixture and carbonizing the same at about 750° C.-900° C.,
   (c) immersing the pellets in a dilute mineral acid solution,
   (d) drying the adequately washed pellets,
   (e) adding about 1-3% coal tar pitch, coal tar, or a combination thereof to the pellets,
   (f) heating the pellets to about 200° C.-400° C.,
   (g) heating the pellets to about 950° C.-1000° C. for about 10-60 minutes, and
   (h) cooling the pellets in an inert gas.

2. A process for manufacturing molecular sieving carbon according to claim 1 wherein the rate of temperature increase between steps (f) and (g) of claim 1 is held substantially constant.

3. A process for manufacturing molecular sieving carbon according to claim 1 wherein the heat treatment described in step (g) of claim 1 is between about 950° C. and 970° C.

4. A process for manufacturing molecular sieving carbon according to claim 1 wherein the heat treatment described in step (g) of claim 1 is maintained for about 20-30 minutes.

5. A process for manufacturing molecular sieving carbon according to claim 1 wherein the cooling temperature used in step (h) of claim 1 is about 300° C. or less.

6. A process for manufacturing molecular sieving carbon according to claim 1 wherein the dilute mineral acid solution used in step (c) of claim 1 is about 0.4 to 0.6N HCL.

7. A process for manufacturing molecular sieving carbon according to claim 1 wherein the heating described in step (f) of claim 1 is effectuated in a rotary kiln.

8. A process for manufacturing molecular sieving carbon according to claim 1 wherein the heating described in step (g) of claim 1 is effectuated in an electric furnace.

* * * * *